July 12, 1932.  J. M. ULRICH  1,867,427
REVERSING MECHANISM FOR POWER BOATS
Filed Feb. 27, 1931  2 Sheets-Sheet 2
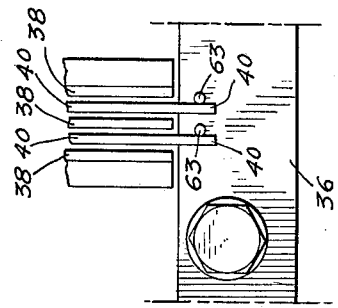
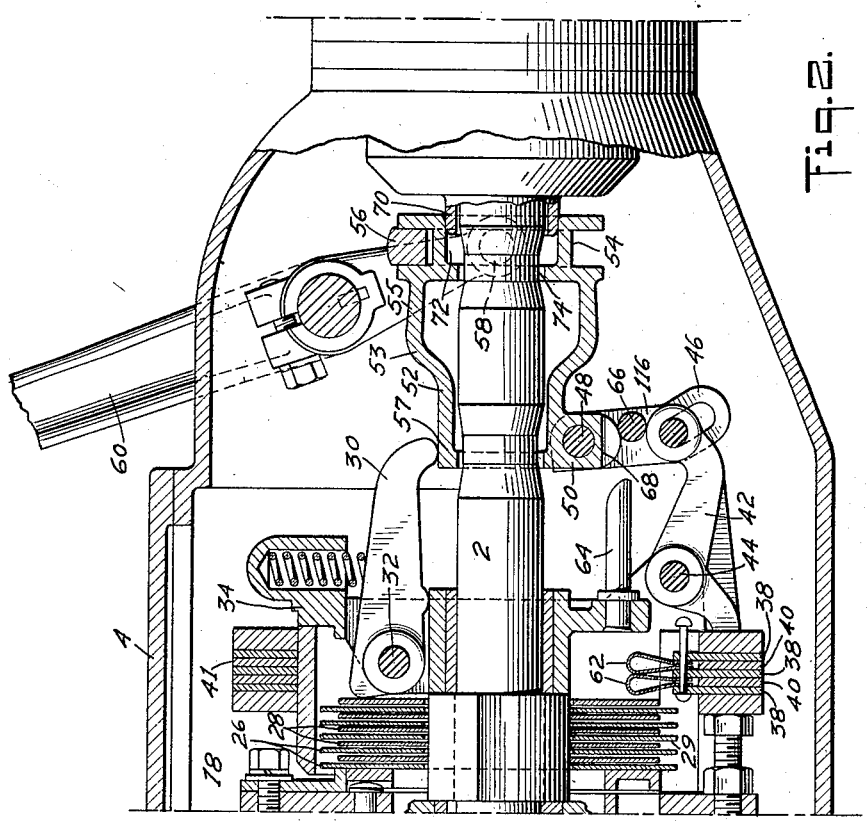
INVENTOR
JULIUS M. ULRICH
by his attorneys
Howson and Howson Patented July 12, 1932

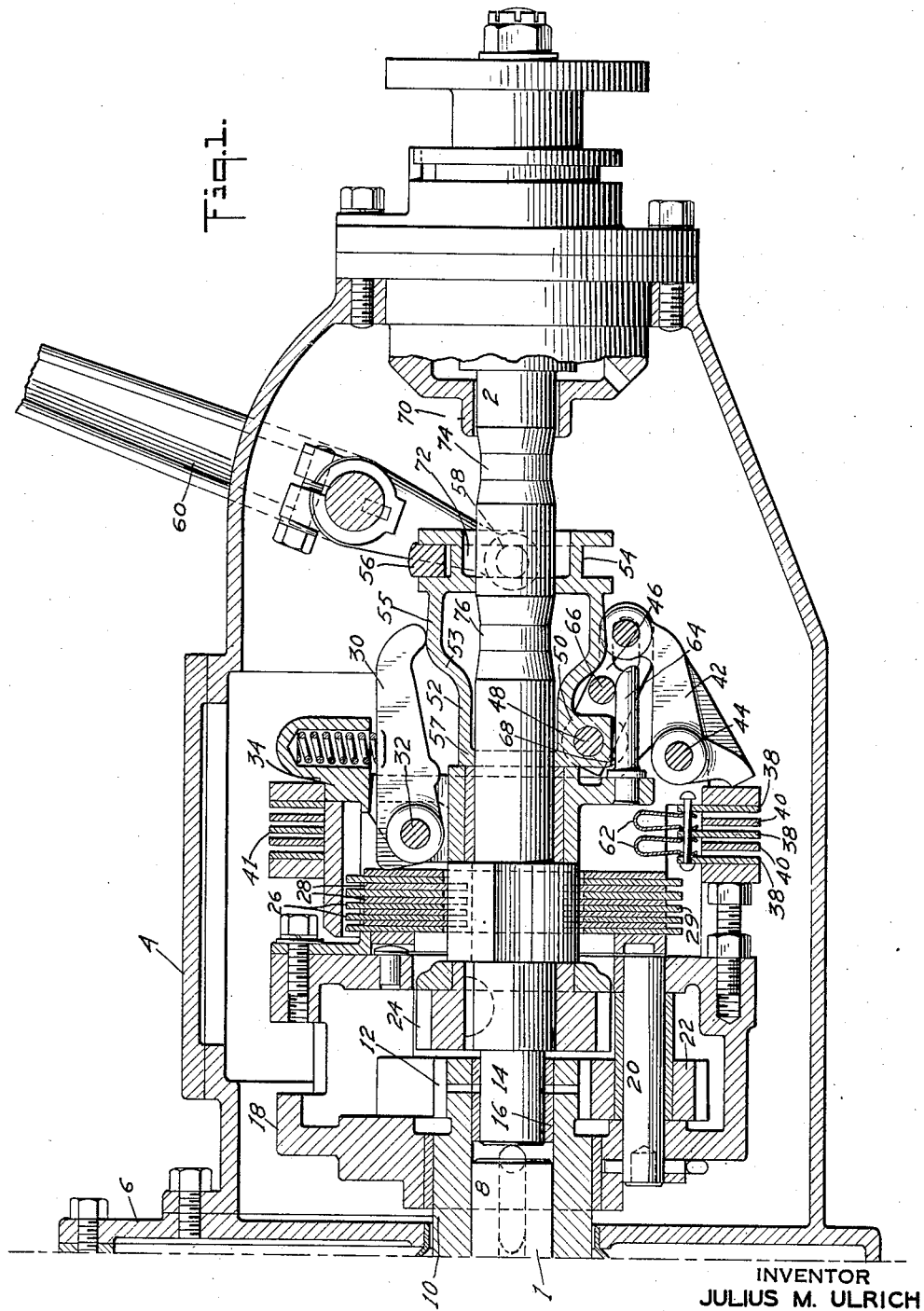

1,867,427

UNITED STATES PATENT OFFICE

JULIUS M. ULRICH, OF RIVERSIDE, CONNECTICUT, ASSIGNOR TO PALMER BROS. ENGINES, INC., OF COS COB, CONNECTICUT, A CORPORATION OF CONNECTICUT

REVERSING MECHANISM FOR POWER BOATS

Application filed February 27, 1931. Serial No. 518,871.

This invention relates to reverse gear mechanisms and more particularly to reverse gear mechanisms in which multiple disk clutches are used for both forward and reverse drives and it is an object of this invention to provide a means by which the reverse drive clutch dogs will be held in released position against the action of centrifugal force when the forward drive clutch is engaged. It is also an object of this invention to provide a means for holding the reverse drive clutch dogs in released position which aids in accelerating the clutch dog operating spool when the forward drive clutch is engaged. It is also an object of this invention to provide means for centering the reverse drive clutch dogs so that uniform pressure will be exerted on different portions of the clutch despite inequalities in manufacture when the reverse drive clutch is engaged.

In the drawings—

Figure 1 is a vertical longitudinal sectional view of a reverse gear mechanism constructed in accordance with this invention, the forward drive clutch being shown engaged;

Figure 2 is a view similar to Fig. 1, the reverse drive clutch being shown engaged; and Fig. 3 is a fragmentary view showing the means for limiting the separation of the plates of the reverse drive clutch.

As shown in the drawings the reverse gear mechanism is interposed between the drive shaft 1 and the driven shaft 2 and is housed within a casing 4 the lower part of which is shown, in this instance, as formed integral with an end 6 of the casing of the motor having the drive shaft 1. Within the casing 4 the end of the drive shaft 1 is reduced as at 8 and has keyed thereto a sleeve 10 having a gear 12 formed at the outer end thereof. The end of the driven shaft 2 is reduced as at 14 and is supported in a bushing 16 within the end of the sleeve 10. Journaled upon the sleeve 10 is a housing 18 in which are mounted pins 20 carrying gears 22 which form part of a train operatively connecting the gear 12 on the sleeve 10 and a gear 24 keyed upon the driven shaft 2. Keyed to the housing 18 and to the driven shaft 2 are the plates 26 and 28 respectively of the forward drive clutch 29. The clutch 29 is the usual type of multiple disk clutch and the plates thereof are forced into engagement by the forward drive clutch operating dogs or levers 30 which are pivotally supported at 32 in a head 34 attached to the housing 18. Keyed to the housing 18 and to anchor plates 36 attached to the casing 4 are the movable plates 38 and stationary plates 40, respectively, of the reverse drive clutch 41. The plates 38 and 40 of the reverse drive clutch are caused to engage by dogs or levers 42 pivotally mounted as at 44 on the head 34 and connected by spaced links 46 to pins 48 mounted in ears or lugs 50 formed integral with the clutch operating spool 52. The clutch operating spool 52 is formed with a tapering portion 53 and a portion 55 of greater diameter than the end portion 57 which portions 53 and 55 engage with the forward drive clutch dogs 30 to operate such dogs to hold the clutch plates 26 and 28 engaged when the spool 52 is shifted to the position shown in Figure 1. To operate the spool 52 the spool 52 is formed with a groove 54 in which is received a collar 56 having trunnions engaging in openings 58 in the lower end of the clutch operating lever 60.

The mechanism so far described is of well known construction and its operation is such that by placing the lever 60 in the position shown in Figure 1, the forward drive clutch operating dogs 30 are operated to engage the plates 26, 28 of the forward drive clutch 29 preventing rotation of the housing 18 with respect to the driven shaft 2 and locking the gears against relative rotation so that the shaft 1 is locked by the gears 12, 22, a gear (not shown) which is carried by housing 18 and engages gears 22 and 24 and gear 24, to the housing 18 and shaft 2 causing the driven shaft 2 to rotate with the drive shaft 1 in the same direction. When the shaft 2 is driven in the same direction as shaft 1 by means of the forward drive clutch 29, the housing 18 is rotated therewith and carries with it the reverse drive clutch operating dogs 42 and their links 46 which are rotated at the same speed as the shafts 1 and 2. Shifting the lever 60 and spool 52 in the opposite direction will cause the spool 52 to release the dogs 30 disengaging the forward drive clutch 29 and operate the links 46 and dogs 42 to engage the reverse drive clutch 41.

Engaging the reverse drive clutch 41 causes the housing 18 to remain stationary with respect to the casing 4 so that the axes of gears 22 and the gear (not shown) which engages gears 22 and 24 remain stationary relative to the axis of the driving and driven shafts causing the drive shaft 1 to drive the driven shaft 2 through gears 12, 22, the gear (not shown) engaging gears 22 and 24 and gear 24 so that the driven shaft 2 rotates oppositely to drive shaft 1.

With the high speeds of the modern motors the centrifugal force operating upon the reverse drive clutch operating dogs 42 and their links 46 when the motor is run at full speed with the forward drive clutch engaged throws the dogs and links outwardly shifting the clutch operating spool 52 and disengaging the forward drive clutch 29. The force acting upon the dogs 42 and links 46 at times shifts the spool 52 to engage the clutch 41. If there is play or slack in their connections to the lugs 50 the dogs 42 tend to engage the plates 38 and 40 of the reverse drive clutch causing heating and wear of the plates even though the spool 52 is not operated to disengage clutch 29. While springs 62 are interposed between the plates of the reverse drive clutch 41, the centrifugal force tending to operate the dogs 42 at the motor speeds in common use today is sufficient to overcome springs 62 unless they are made of such weight as to be impracticable in a construction of this kind. The springs 62 therefore, are made of sufficient strength to hold the plates disengaged under the usual pressures resulting from centrifugal force when the lever 60 is in neutral position and the motor is idling. Pins 63 in the plate 36 engage with the stationary plates 40 and limit their movement when the plates are separated by the springs 62 and thus aid in maintaining proper clearance between the adjacent plates when the clutch is disengaged.

To prevent the reverse drive clutch operating dogs 42 from acting under centrifugal force to shift spool 52 or engage the plates 38 and 40 when the spool 52 is in the position shown in Figure 1, there is provided a pin 64 mounted in the head 34 at each dog 42 and engaging outside a pin 66 extending between the links 46. Each pin 64 is so related to the pin 66 that the centrifugal force tending to throw the dogs 42 and links 46 outwardly when the forward drive clutch 29 is engaged will be overcome by the pins 64 which prevent outward movement of the dogs 42 and their links 46, thus holding the dogs 42 in the released position and permitting the springs 62 to maintain the plates 38 and 40 of the reverse drive clutch separated. With the dogs 42 and their links 46 held, as shown in Figure 1, there is no force acting to shift the spool 52 on the shaft 2 and release the forward drive clutch 29.

To aid in accelerating spool 52 and relieve the strain on the dogs 42 and links 46 when the forward drive clutch 29 is engaged, the ears or lugs 50 are grooved as at 68 to receive the pins 64 so that as the head 34 is rotated carrying with it the pins 64, the pins 64 will, through their engagement in the grooves 68, drive the spool 52.

When the lever 60 is shifted to the reverse position, the movement of the lever 60 causes the spool 52 to travel on the driven shaft 2 and, through links 46, operate the dogs 42 to engage the plates 38 and 40 of the reverse drive clutch 41 thereby retaining the casing 18 against rotation and causing the shaft 2 to be driven from the shaft 1 through the gears in the usual manner. As the spool 52 is moved along the shaft 2 the spool guide or pilot 70 engages in the recess 72 formed in the adjacent end of the spool 52 and serves as a pivot or center on which the spool 52 may pivot so that, despite slight inequalities in the links 46 and dogs 42, the pressure of the dogs 42 on the reverse drive clutch will be uniform at all points where the dogs engage. To permit of the pivoting of the spool 52 on the pilot 70, the driven shaft 2 is reduced slightly as at 74 and 76 to provide the proper clearance between the spool 52 and the driven shaft 2 in case the spool 52 is positioned slightly angularly to the shaft 2.

As the spool 52 is moved from the position shown in Fig. 1 to that shown in Fig. 2 the pin 66 is moved along the pin 64 and passes beyond the end thereof so there is no interference with the outward movement of the dogs 42 and links 46. As the spool 52 is returned to the position shown in Fig. 1 the pin 66 passes in behind the pin 64 to the position shown in Fig. 1, the pin 64 being tapered at its end to permit free movement of the pin 66. In the neutral or intermediate position the pin 66 is clear of the pin 64.

I claim—

1. In a reverse gear, a drive shaft, a driven shaft, forward and reverse drive clutches for connecting said drive and driven shafts, means for operating said clutches, yielding means for holding one of said clutches disengaged when both clutches are disengaged and means engaging the operating means of said one clutch to prevent operation thereof under centrifugal force when the other clutch operating means is operated.

2. In a reverse gear, a drive shaft, a driven shaft, forward and reverse drive clutches for connecting said shafts, means for operating said clutches and holding means for preventing the operation by centrifugal force of said reverse drive clutch operating means when said forward drive clutch is engaged, said holding means being engaged by said clutch operating means during the operation thereof.

3. In a reverse gear, a drive shaft, a driven shaft, forward and reverse drive clutches for connecting said drive and driven shafts, levers for operating said clutches, a means for operating said levers and holding means for preventing said reverse drive clutch operating levers from engaging said reverse drive clutch when said means operates said forward drive clutch operating levers, said holding means being engaged by said reverse drive clutch operating means during the operation thereof.

4. In a reverse gear, a drive shaft, a driven shaft, forward and reverse drive clutches for connecting said drive and driven shafts, levers for operating said clutches, a means for operating said levers and holding means engaging said operating means during the operation thereof for preventing said reverse drive clutch operating levers from shifting said lever operating means and disengaging said forward drive clutch when said lever operating means is in position to operate said forward drive clutch operating levers.

5. In a reverse gear, a drive shaft, a driven shaft, forward and reverse drive clutches for connecting said drive and driven shafts, levers for operating said clutches, a spool for operating said levers and means for preventing said reverse drive clutch operating levers operating under centrifugal force to shift said spool to release said forward drive clutch operating levers from clutch operating position.

6. In a reverse gear, a drive shaft, a driven shaft, forward and reverse drive clutches for connecting said drive and driven shafts, levers for operating said clutches, a spool for operating said levers and means preventing said reverse drive clutch operating levers from operating under centrifugal force when said forward drive clutch is engaged to shift said spool to disengage said forward drive clutch and engage said reverse drive clutch.

7. In a reverse gear, a drive shaft, a driven shaft, forward and reverse drive clutches for connecting said shafts, levers for operating said clutches, a collar on said driven shaft for operating said levers, links connecting said reverse clutch operating levers and said collar and means engaging said links and collar during the operation thereof to lock said reverse clutch operating levers and links in position against centrifugal force and drive said collar when said collar operates the levers to engage said forward drive clutch.

8. In a reverse gear, a drive shaft, a driven shaft, forward and reverse drive clutches for connecting said shafts, levers for operating said clutches, a spool for operating said levers, links connecting said reverse drive clutch operating levers and said spool and means engaging said links during the operation thereof to prevent operation of said reverse drive clutch operating levers by centrifugal force when said forward drive clutch is engaged.

9. In a reverse gear, a drive shaft, a driven shaft, forward and reverse drive clutches for connecting said shafts, means for operating said clutches and means engaging part of said clutch operating means to drive the same when one of said clutches is engaged, said means being disengaged from said part when the other of said clutches is engaged.

10. In a reverse gear, a drive shaft, a driven shaft, forward and reverse drive clutches for connecting said shafts, levers for operating said clutches, a spool for operating said levers, links connecting said reverse drive clutch operating levers and said spool and means engaging said links to prevent operation of said reverse drive clutch operating levers by centrifugal force when said forward drive clutch is engaged, said link engaging means driving said spool when said forward drive clutch is engaged.

11. In a reverse gear, a drive shaft, a driven shaft, forward and reverse drive clutches for connecting said drive and driven shafts, levers for operating said reverse drive clutch, a collar on one of said shafts for operating said levers and links connecting said reverse drive clutch operating levers and collar, said shaft being grooved to permit said levers and links to center said collar and maintain clearance with said shaft when said reverse drive clutch is engaged.

12. In a reverse gear, a drive shaft, a driven shaft, forward and reverse drive clutches for connecting said drive and driven shafts, levers for operating said clutches, a collar on one of said shafts for operating said levers, links connecting said reverse drive clutch operating levers and said collar, means cooperating with said links to hold said reverse drive clutch operating levers away from said reverse drive clutch when said forward drive clutch is engaged and means centering said collar and maintaining clearance between said collar and shaft when said reverse drive clutch is engaged.

13. In a reverse gear, a drive shaft, a driven shaft, forward and reverse drive clutches for connecting said shafts, levers for operating said clutches, a spool for operating said levers, and driving means for said spool engaging said spool as said forward drive clutch is engaged.

14. In a reverse gear, a drive shaft, a driven shaft, forward and reverse drive clutches for connecting said shafts, levers for operating said clutches, a spool for operating said levers, links connecting said spool and said reverse drive clutch operating levers and holding means for said reverse drive clutch operating levers and links engaging with said spool to drive said spool when said forward drive clutch is engaged.

In testimony whereof I have signed my name to this specification.

JULIUS M. ULRICH.